United States Patent [19]
Medal

[11] Patent Number: 5,391,031
[45] Date of Patent: * Feb. 21, 1995

[54] METHOD AND INSERT FOR CONNECTING COMPONENTS TO PLASTIC MEMBERS

[75] Inventor: James Medal, Cape Coral, Fla.

[73] Assignee: Unimation, Inc., Ft. Myers, Fla.

[*] Notice: The portion of the term of this patent subsequent to Jun. 29, 2010 has been disclaimed.

[21] Appl. No.: 84,699

[22] Filed: Jun. 29, 1993

Related U.S. Application Data

[63] Continuation-in-part of Ser. No. 887,722, May 22, 1992, Pat. No. 5,222,850.

[51] Int. Cl.⁶ .................. F16B 37/04; F16B 39/02
[52] U.S. Cl. ...................... 411/82; 411/180; 411/258; 411/908
[58] Field of Search ............... 411/82, 178, 180, 171, 411/258, 427, 908; 285/21, 915

[56] References Cited

U.S. PATENT DOCUMENTS

| | | |
|---|---|---|
| 3,353,849 | 11/1967 | Laurizio . |
| 3,403,718 | 10/1968 | Hughes ................. 411/180 |
| 4,626,308 | 12/1986 | Ansell ................... 285/21 |
| 4,842,462 | 6/1989 | Tildesley ............... 411/180 |
| 4,906,313 | 3/1990 | Hill ....................... 285/21 |
| 4,927,183 | 5/1990 | Steinmetz et al. ..... 285/21 |
| 4,938,314 | 7/1990 | Sitzler et al. .......... 411/180 |
| 4,941,788 | 7/1990 | Highfield .............. 411/180 |

FOREIGN PATENT DOCUMENTS

| | | |
|---|---|---|
| 2461142 | 3/1981 | France ................... 411/180 |
| 3209920 | 9/1983 | Germany . |

*Primary Examiner*—Neill R. Wilson
*Attorney, Agent, or Firm*—Fitch, Even, Tabin & Flannery

[57] ABSTRACT

Disclosed is an insert comprising a tubular plastic body having a hollow, axially extending threaded interior, and a plurality of interlocking portions preferably in the form of integrally formed plastic protrusions extending outward from the plastic body. The insert is maintained by force-fit engagement within a corresponding recess in a plastic base. Thereafter, the plastics of the body, protrusions and base are brought to a flowable condition at their interface to integrally bond the insert to the base and/or to interlock portions of the base and insert. The threaded interior of the insert remains intact during this insert bonding procedure to then accept and threadably engage with a threaded member, which may be metal or any other material. The metal threaded fastener may be already threaded into the insert at the time of bonding together of the plastics of the insert and base so that a driving of the metal fastener into the base is eliminated. A plastic fastener having protrusions thereon may be force fitted into bores in a first plastic body to be joined to the second plastic body; and a bonding agent liquifies the plastic of the protrusions and the plastic of the bore walls to cause an intermixing of the plastics which, when solidified, bond the fastener to respective plastic bodies and through the fastener to one another. The preferred plastic fastener has a force fit with the bores, and an ultrasonic device may be used to liquify the plastics and cause an intermixing thereof prior to solidification.

5 Claims, 3 Drawing Sheets

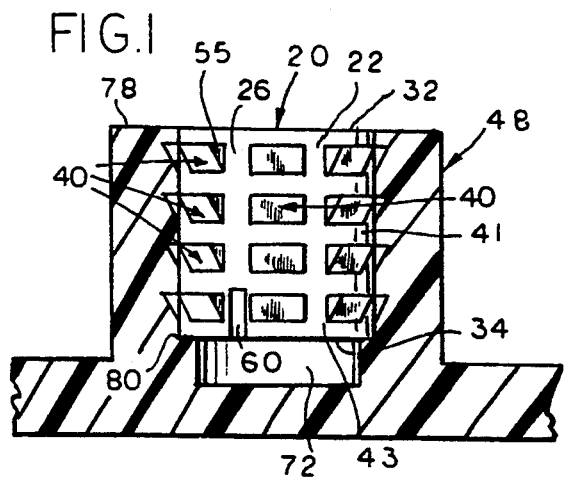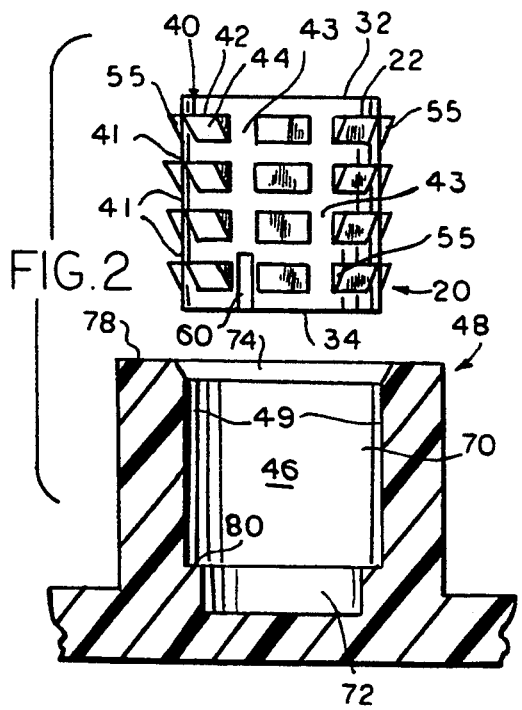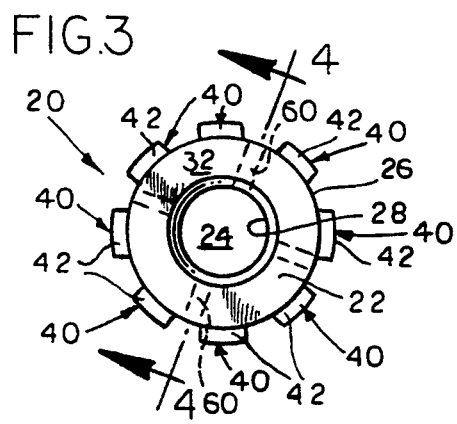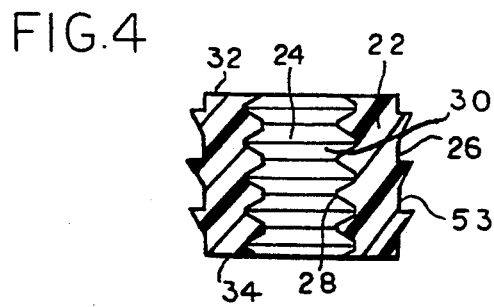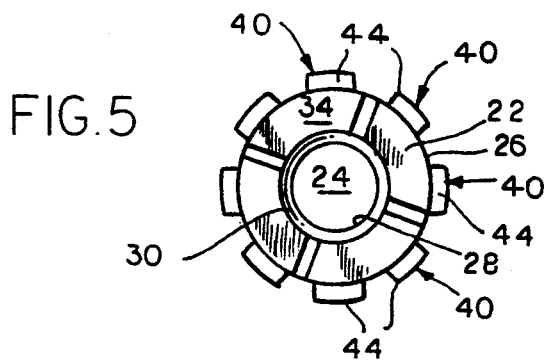

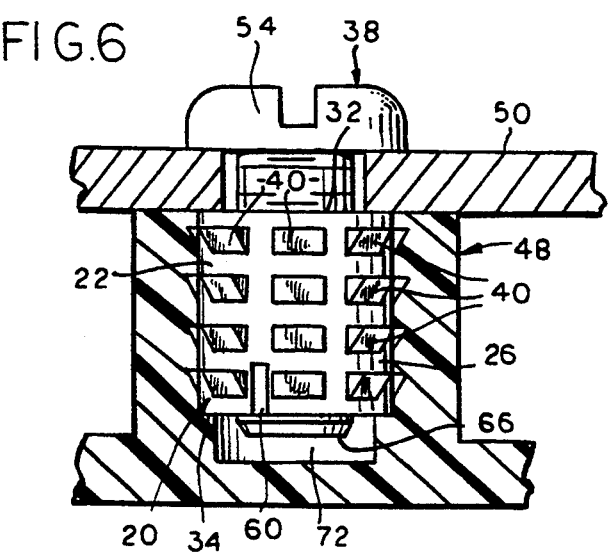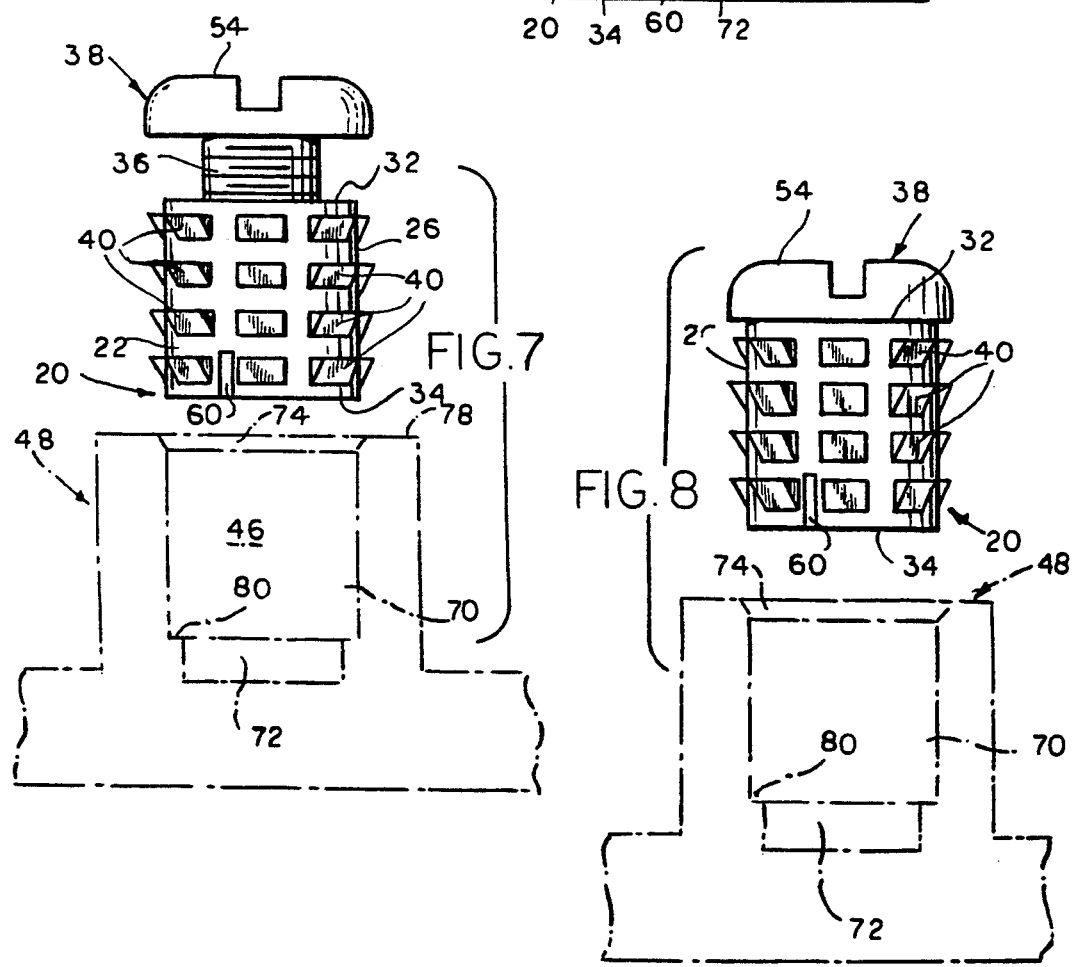

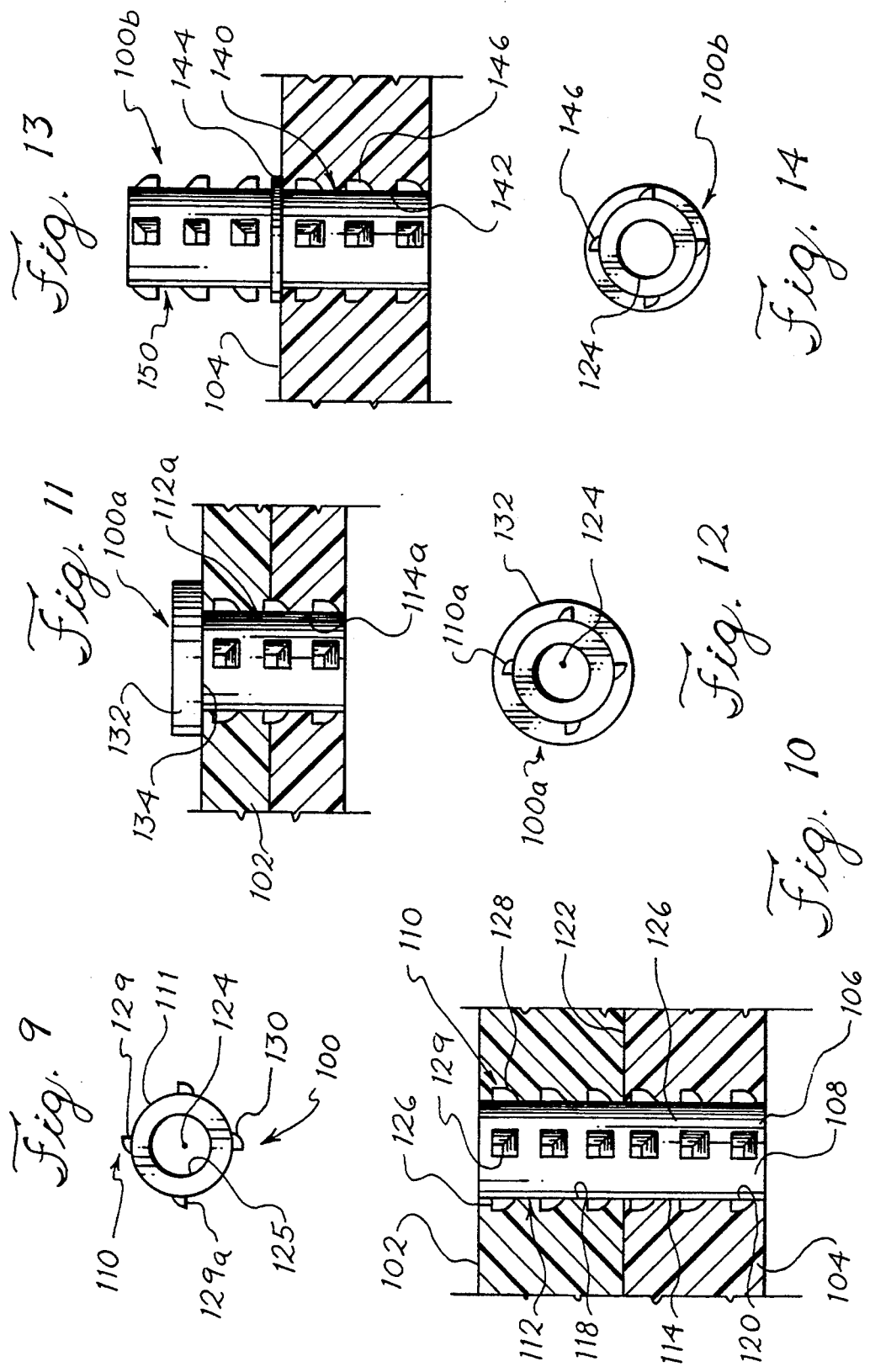

METHOD AND INSERT FOR CONNECTING COMPONENTS TO PLASTIC MEMBERS

FIELD OF THE INVENTION

This application is a continuation-in-part application of application Ser. No. 887,722, filed May 22, 1992, now U.S. Pat. No. 5,222,850.

The present invention pertains to a method of and assembly for providing plastic bodies joined together with another plastic fastener.

BACKGROUND OF THE INVENTION

Molded plastic parts have becoming increasingly popular, due at least in significant part to their low production cost. Hence, often, one or more components of an assembly are formed of molded plastic. In assembling a final product it is often necessary to fasten the molded plastic parts to each other or to other components to produce the final product.

Current production methods for fastening components to a plastic part of low ductility include forming a threaded recess in the plastic part, which serves as a base, and into which a threaded member or fastener is screwed. This has been found to be undesirable in several respects. The brittle nature of polycarbon and other plastics employed makes it difficult to cut threads in the polycarbon base for receiving the threaded member. During thread formation, the brittle polycarbon base material has been found to crack and chip, often making insertion of the threaded fastener difficult or impossible. Also, the chipping reduces the bearing surface area against which the threads of the fastener bear against the base to preclude the fastener from being pulled out of the base. Thus, the load bearing capacity of the threaded member is significantly reduced.

Due to the aforementioned difficulties associated with pre-threading brittle plastic base materials, other, less desirable, fastening means have been employed. One such alternative fastening means attempted has been to employ a self-threading screw. However, the brittle nature of the plastic base material precludes the formation of a consistent thread therein, with a resultant cracking of the base.

Alternatively, internally threaded metal inserts have been molded to the base, with the threaded fastener then screwed into the internal threads of the metal insert. However, due to the inherent incompatibility of metals and plastics, the bond therebetween has been found inadequate to maintain bonding of the metal insert to the plastic base when the metal insert is pulled with significant force. Bonding of the metal insert is attained by providing the metal insert with grooves, ridges or knurls and bringing the base plastic to a flowable state whereby the base plastic flows into the grooves, ridges or knurls of the insert. Accordingly, the strength of the bond is only derived from the base plastic, and limited thereby. Hence, upon imposition of significant forces pulling on the metal insert, the insert is pulled from the base, together with any threaded member screwed into the insert. Additionally, formation of the metal inserts adds considerable expense to the overall production cost.

One method currently employed for fastening components to the base which provides the desired bonding strength is a conventional screw and nut assembly. However, this is undesirable in several respects. Functionally, the screw and nut assembly loosens over time, resulting in a loose connection between components. Also, aesthetically, screw and nut assemblies are undesirable due to the requirement of a provision for accommodating the nut or the nut being exposed on one end of the base, rather than allowing for employment of a blind tapping which provides superior aesthetics. Furthermore, the requirement of the metal nut adds undesirable cost to production.

In accordance with another aspect of the invention, there is a need for eliminating the driving of a metal fastener into the plastic base. This operation of driving the metal fastener requires assembly time and the use of labor. Overall production efficiency could be obtained by eliminating a tapping of a thread into a plastic base and/or the driving of a fastener into the thread in the plastic base. In its preferred form the invention allows elimination of the driving of the fastener into the plastic base thereby increasing overall efficiency in mounting components to a plastic base with a metal threaded fastener.

The present invention is also directed to joining together to plastic bodies such as two plastic components or a pair of plastic sheets or plates with one or more plastic fasteners. While metal fasteners may be used as above-described, there are times when it is desired not to use metal and still join plastic parts or components together to form a composite of the two joined parts. In such instances, it is preferred that the plastic fastener form a strong, secure connection that will not readily loosen as may a plastic screw that is threaded into the parts to join them together. Preferably, the plastic fastener should bond the two plastic bodies together much in the manner that of an integral bond therebetween.

SUMMARY OF THE INVENTION

In accordance with the present invention, two plastic bodies are joined together by forming bores in each of the plastic bodies and inserting into the bores a plastic fastener body having spaced projections thereon. The projections are sized to have a force fit with the bore walls in the respective plastic bodies. Thereafter, the projections and the plastic in the bore walls are brought to a flowable state at the interface therebetween whereby they flow and meld together; and thereafter, solidify and integrally bond the fastener to each of the parts. Usually, the plastic bodies have interior surfaces abutted against each other, and the plastic fastener becomes almost integral with the respective plastic bodies. Usually, the protrusions liquify and flow and become so integrated with the plastic that a cut through the plastic fastener fails to reveal the protrusions or a line of demarcation between the fastener and the parts, particularly where the same plastic is used for the fastener and the parts.

One manner of achieving the flowable state is the use of ultrasound to heat the respective plastics to a flowable state at the interface therebetween with the small protrusions rapidly melting and flowing into molten plastic from the adjacent bore wall. The force fit or compression at the points of the protrusions assists in causing the protrusions to flow into the space between adjacent protrusions and losing their shape and identity.

The preferred manner of joining the plastic fastener to a plastic body is by use of a bonding agent such as an acetone, a liquid cyanoacrylate ester, or the like that liquifies the plastic of two abut pieces under pressure or compression.

BRIEF DESCRIPTION OF THE DRAWINGS

In the drawings, wherein like elements are referenced alike:

FIG. 1 is a side elevational view of an insert embodying various features of the present invention, shown inserted into a base recess, with the base in cross-section;

FIG. 2 is a side elevational view of the insert and cross-sectional view of the base recess of FIG. 1, shown here with the insert spaced above the base recess;

FIG. 3 is a plan view of the insert of FIG. 1;

FIG. 4 is a cross-sectional view of the insert of FIG. 1, taken along line 4—4 of FIG. 3;

FIG. 5 is a bottom view of the insert of FIG. 1;

FIG. 6 is a side elevational view of an insert inserted into a base recess, with a threaded member extending through an aperture in a component and received in the insert to fasten the component to the base;

FIG. 7 is a side elevational view of an insert having a threaded member partially inserted therein, shown spaced above a base recess which is shown in phantom; and FIG. 8 is a side elevational view of an insert having a threaded member fully inserted therein, shown spaced above a base recess which is shown in phantom.

FIG. 9 is a plan view of a plastic fastener constructed in accordance with the invention;

FIG. 10 is a side elevational view of the plastic fastener of FIG. 9;

FIG. 11 is a side elevational view of a plastic fastener having a head and constructed in accordance with another embodiment of the invention;

FIG. 12 is a plan view of the plastic fastener of FIG. 11;

FIG. 13 is a side elevational view of a plastic fastener having a central collar and constructed in accordance with another embodiment of the invention; and FIG. 14 is a plan view of the plastic fastener of FIG. 13.

DETAILED DESCRIPTION OF THE PREFERRED EMBODIMENTS

As shown in the drawings for purposes of illustration, the invention is embodied in a plastic fastener 100 (FIGS. 9–14) for joining two plastic bodies 102 and 104 together. By way of introduction, the subject matter of the co-pending parent application illustrated in FIGS. 1–8 will be first described. The invention of FIGS. 1–8 involves an insert 20 preferably formed of plastic and by a conventional molding process.

The insert 20 comprises a body 22 formed into the shape of a right circular cylinder and having an axially extending hollow interior bore or passageway 24 therethrough. The body 22 defines an exterior surface 26 and interior surface 28. The interior surface 28 is formed having threads 30 therein, extending the length of the insert 20 from its upper end 32 to its lower end 34. The internal threads 30 of the insert 20 are formed to correspond to the threads 36 of the screw or threaded member 38 (see FIG. 7) to allow the threaded member 38 to be screwed into the insert 20 and threadably engage therewith. This is discussed further, below.

A plurality of protrusions 40 are formed integral with the insert body 22 and extend radially outward from the exterior surface 26 of the insert 20. The projections 40 are preferably wedge-shaped as shown in the drawings, having a flat, generally horizontal upper end 42 and angled lower side or portion 44. The projections 40 are arranged in vertical rows with projections spaced by vertical spaces or gaps 41 (FIG. 2) from one another within a row. The rows are spaced angularly in a circumferential direction by spaces 43 between adjacent rows or projections.

The cylindrical recess 46 in the base is formed having a diameter larger than the outer diameter of the insert body 22, but smaller than the diameter defined by the outer tips of projections 40. The angled portion 44 of the wedge shaped projections 40 serves as a camming or bearing surface upon force-fit insertion of the insert 22 into a cylindrical recess 46 of a plastic base 48. Thereby, the projections 40 deflect or deform slightly during insertion of the insert 20 into the recess 46 of the base 48 so that the insert 22 is wedged in a stationary position inside the base recess 46.

Depending upon the type of plastic material selected for the insert 20 and base 48, the projections 40 of the insert 20 may burrow into the plastic of the base 48 as illustrated in the drawings, or may only scratch the wall of the base recess 46 upon insertion without digging significantly into the base material. Either way, the insert 20 remains in a stationary position by force-fit insertion within the base recess 46, with the interior threads 30 of the insert remaining intact.

After the insert 20 has been fully inserted into the recess 46, the insert 20 and base 48 are brought to a flowable state at their interface, by ultrasound or other suitable technique, such as a bonding agent. A suitable bonding agent is one using acetone or cyanoacrylate ester that causes the plastics to form a liquid or semi-liquid state initially and then to cure or otherwise harden. Thus, the plastic of the projections 40 flows with the plastic of the base 48 into the spaces 43 and gaps 41 about the projections 40 and plastic of the base also liquifies and flows into these gaps and spaces. It will be appreciated that plastic liquefying and flowing to rest on the upper ends 42 of the projections 40 or liquefying and combining with the plastic of the upper ends 42 of the projections provides a good strong barrier to upward pulling forces tending to pull the insert from the base. The plastic liquefying and flow into the circumferential spaces 43 between adjacent rows of projections will resist angular torque loads trying to turn or to rotate the insert in the base recess 46. That is, plastic from the internal recess wall 49 of the base and plastic from outer circumferential wall 53 (FIG. 4) as well as from outer surfaces of the projections 40 liquifies and flows together so that triangular shaped, vertical sides 55 on the projections abut against this liquified and reformed plastic when a turning torque tries to turn the insert in the base. This creates a region of blended plastics immediately surrounding the body 22 of the insert 20. Upon cooling or curing, the plastics solidify, with the insert 20 integrally bonded with the base 48. The interior threads 30 of the insert 20 remain intact throughout the ultrasound and cooling operations, whereby upon screwing of a threaded member 38 into the insert 20, the threads 36 of the threaded member 38 engage with the threads 30 of the insert 20 to secure the threaded member 38 within the insert 20.

Hence, the insert 20 bonds integrally with the base 48 about the exterior of the insert 20, with the interior threading 30 of the insert 20 providing a site for threaded engagement of a screw or other threaded member 38. With brief reference to FIG. 6, to attach a component 50, which may be a metal, plastic, or any other material, to the base 48, an insert is bonded integrally to the base 48 in the aforementioned manner, and then a screw or other threaded member 38 is passed through an aperture 52 in the component 50 and screwed into the threaded interior of the insert 20. The component 50 is thus secured between the base 48 and the head 54 of the screw 38.

In accordance with one aspect of the invention, the insert 20 may include a filler of glass, metal or the like. The filler flows or migrates together with the plastics of the insert 20 and base 48 to provide increased strength to the blended region surrounding the insert 20. The filler results in greater strength because it flowed into the gaps 41 between projections and spaces 43 between rows of projections and fills at least partially these spaces and gaps and because it is at the bonding points between the insert 20 and base 48.

In accordance with another aspect of the present invention, the insert 20 has a plurality of slots 60 at its lower end 34. When brought to a flowable state, the overflow of the plastics of the base 48 and insert 20, together with any fillers, migrate into the slots 60. Upon cooling, this provides additional bonding of the insert 20 to the base 48, with small portions of plastic integral with the base 48 extending through the slots 60 to further retain the insert 20 in a stationary position. The material in the slots particularly resists turning torques trying to rotate the insert in the base. The threaded member 38 may be short and extend only part way into the insert 20, or may be long and extend completely through the insert 20. With employment of screws or other threaded members 38 which are long enough to extend down to the slots 60, the slots 60 also serve to provide locking of the screw or other threaded member 38. Plastic flowing through the slots. 60 contacts the lower end 66 of the threaded member 38, and when that plastic hardens it bears against the threaded member 38 in place, resisting rotation of the screw in the insert. If the screw 38 is already threaded into the insert at the time of plastic flow within the slots, the plastic flows against the threads and acts as an inhibitor to turning of the screw. If no screw is present at the time of plastic flow into and through the slot 60, then the screw will cut a thread into this plastic flow now projecting into the hollow bore 24 when the screw is fully threaded into the insert. The plastic in the slot and engaging the screw acts to retard any unscrewing of the screw as by vibration.

As stated previously, the present invention is particularly directed to, in its preferred embodiment, to providing a fastener 38 preassembled into the insert thereby eliminating the usual time consuming and expensive assembly operation of aligning a fastener with a threaded bore and then turning the fastener into the threaded bore. In some instances, the screw may be a self tapping screw; but nonetheless a driving operation is required. Labor can be reduced and overall efficiency can be improved by either molding the insert plastic material around the fastener 38 to provide a preassembled insert and fastener combination or by selling to a user the preassembly of the insert 26 and fastener 38 so that the fastener threading is eliminated at the place of usage of the preassembled fastener and insert assembly. A better and tighter fastener fit in the insert is obtained by molding the insert about a threaded fastener inserted into plastic mold. The plastic will fill and conform to any irregularities in the screw thread thereby resisting a turning of the screw thread in the removal direction. It will be appreciated that, where the screw thread is formed in the insert, prior to assembling the fastener therein, the tightness of the joinder of the component 50 to the base 48 is limited by the tolerances between the threads 36 of the screw 38 and the threads 30 of the insert 20. When the insert 20 is molded together with and about a threaded member 38, a perfect thread match is realized between the threads 36 of the screw or other threaded member 38 and the threads 30 of the insert 20. The threaded member 38 may be coated with a high temperature lubricant to create a barrier between the plastic insert 20 and the metal threaded member 38, to allow the threaded member 38 to rotate freely following cooling of the freshly molded insert 20.

Thus, in this embodiment, a one-piece assembly is produced, such as that illustrated in FIG. 8, having a threaded member 38 residing within an insert 20 which has been formed about the threaded member. The threads 36 of the threaded member 38 define the threads 30 of the insert 20, so that an optimal engagement therebetween is realized. The threaded-fastener-and-insert-assembly is insertable as an assembly into a corresponding recess 46 of the base 48, and bonded to the base in the aforementioned manner.

The insert 20 may be bonded to the base 48 by molding during formation of the base 48, or may be bonded to the base 48 by ultrasound after the base 48 has already been formed. This is an important feature of the invention, in that significant cost savings are realized by the ability to provide the base with a site for threaded engagement during formation of the base, rather than having to bond the insert to the base in a post-molding operation.

Bonding of the insert 20 to the base 48 during the formation of the base 48 eliminates the previously-required additional production step of first forming a base 48 having a recess 46 and then, later, affixing an insert 20 within the recess 46. By molding the insert 20 to the base 48 during formation of the base 48, significant cost savings in production are realized.

The insert 20 of the present invention also lends itself to use with attaching components to a soft, pliable base 48. The compatible, higher strength insert 20 is bonded to the soft, pliable base 48 by bringing the plastics of the insert 20 and base 48 to a flowable condition at their interface, as discussed above. The higher strength plastic of the insert 20 blends with the lower strength plastic of the base 48 to provide increased material strength for securing a threaded member 38 thereat. Accordingly, the insert 20 expands the use of such softer plastics.

The recess 46 formed in the base 48 preferably has a configuration such as that shown in FIGS. 2, 7 and 8. The illustrated recess 46 comprises two concentric cylindrical sections; intermediate section 70 of a diameter corresponding to the diameter of the insert 20, and lower section 72 of reduced diameter. The uppermost portion 74 of the recess 46 tapers outwardly or is chamfered, to provide an angled bearing surface for the projections 40 to bear against during initial insertion of the insert 20 into the recess 46. The chamfered upper end portion 74 also allows the upper end 32 of the insert 20 to lie below the plane of the upper end 78 of the portion of the base 48 surrounding the recess 46.

The provision of the reduced diameter at the lower portion 72 of the recess 46 serves as a stop to define the extent of insertion of the insert 20 by abutment of the lower end 34 of the insert 20 against the ledge 80 at the step-down. The lower portion 72 also receives any excess overflow material from the insert bonding operation. Additionally, the lower portion 72 also allows for the use of screws 38 which are longer than the insert 20, with the leading end 66 of the screw 38 extending beyond the lower end 34 of the insert 20 and being received within the lower portion 72 of the recess 46. In this manner, the same inserts 20 may be employed with varying lengths of screws 38 with the depth of the lower portion 72 being varied in relation to the length of screw 38 being employed.

Referring now to the embodiment of the invention shown in FIGS. 9 and 10, the invention is shown in a plastic fastener 100 having an integral, one-piece fastener body 106 formed of plastic having an outer, exterior wall 108 from which project a number of protrusions or projections 110. The illustrated fastener is formed with a cylindrical shape but it can be made of other shapes for example, polygonal, and still fall within the purview of the invention. The two bodies 102 and 104 to be joined together by the plastic fastener are first drilled to have aligned holes or openings 112 and 114 therein sized to have a force fit with the projections 110 on the exterior wall of the plastic fastener. Manifestly, the holes 112 and 114 could be preformed at the time of molding of the plastic bodies 102 and 104.

The preferred manner of securing the bodies 102 and 104 with the plastic fastener 100 is to coat the exterior fastener wall 108 and projections 110 with a liquid bonding agent as by an applicator 116 with a bonding agent such as for example, acetone or cyanoacrylate ester. The holes 112 and 114 may also be separately coated with a bonding agent although this is not usually necessary. The bonding agent such as cyanoacrylate ester works with application of pressure, such as applied from the force fit of the plastic fastener by driving it into the aligned holes 112 and 114 in the two plastic bodies. The protrusions 110 actually liquify or flow under pressure and from the breakdown thereof by the bonding agent to commingle with the plastic from bore walls 118 and 120 of the holes 112 and 114. The bonding agent also liquifies the bore walls. The commingled plastics flow together and solidify, that is, cure or harden to form a solid plastic interface between the plastic of the fastener and the plastic of the upper body and the plastic of the lower body. Thus, there will still be interface 122 between the upper and lower bodies 102 and 104 at their interior abutting faces except for that solid central portion of the plastic fastener body bridging the interface 122, and connecting the upper and lower bodies together.

Surprisingly, when cutting a cross-section through the fastener 100 and upper and lower bodies 102 and 104 after application of the bonding agent, there may be no indication of the protrusions 110 or of interface between the bore walls 118; 120 and the exterior wall 108 of the fastener. More specifically, in one example, the upper and lower bodies were flat plates of a PBT plastic sold under the trademark VALOX by General Electric Company; and the plastic fastener was also made of Valox plastic. The bonding agent used was cyanoacrylate ester. The Valox plastic of the three pieces had so intermingled that no protrusions were visible, no marks were visible as being made by the protrusions, and there was no line of demarcation between the fastener and the plates or other indications of where the exterior wall 108 of the fastener 110 had been. Also, no voids were found which would correspond to spaces 111 that existed between protrusions 110 on the plastic fastener 100.

The illustrated fastener 100 is a hollow cylinder in shape with an interior bore 124 extending the full length of the fastener body. Thus, the fastener has annular body with central hollow bore 124. The internal bore 124 may be made with a screw thread 125 to receive a metal screw to be threaded therein. The preferred protrusions are made with reverse sloping walls so that one pair of protrusions in each row resists a clockwise turning force and the other pair of protrusions in the same row resists a counterclockwise turning force. The preferred protrusions have a flat upper side 126 that is generally horizontal and upwardly and outwardly inclined bottom side 128 to aid in driving and camming the fastener body down into the holes 112 and 114. If the bonding is achieved by heat melting of the protrusions and exterior wall, as from an ultrasonic bonding device, the protrusions may have deflected and deformed as they were driven into the bore walls and indentations may be made thereby into the bore walls 118 and 120. After application of ultrasonic heating and melting and intermixing of plastics, the protrusions and indentations are generally no longer visible when a cut is made therethrough at a later time after plastic resolidification.

To prevent a twisting in either a clockwise or counterclockwise direction, there is a flat side 129, 129a and a sloped side 130 on each protrusion with one pair of flat sides 129 being on the clockwise side of the protrusions, and the other flat sides 129a being on the counterclockwise side of another pair of protrusions in each row of protrusions. Manifestly, the protrusions 110 and the spaces 111 therebetween may have various shapes from those illustrated herein and still fall within the purview of the invention.

In some instances, it may be preferred to eliminate the interior bore of the fastener 100 and to provide a stop to limit the amount of insertion of the fastener into the upper and lower bodies. This is achieved in the embodiment of the invention illustrated in FIGS. 11 and 12, in which a plastic fastener 100a is formed as the fastener 100 described above except that a flat enlarged head 132 is integrally formed on the top of the fastener body having the protrusions 110a which are identical to the protrusions 110 described above. When force fitting the fastener 100a into holes 112a and 114a, the head may be hit with hammer blows or a steady pressure to push the lower body and protrusions into the aligned holes; and when a lower side 134 of the head hits upper, outer surface of the upper body 102, the fastener 100a will be full driven and stopped against further inward travel. If desired, a bonding may also be achieved between the lower side 134 of the fastener head 132 and the top side of upper body by applying the bonding agent to the lower side of the head and forcing it under pressure against the facing plastic surface of the upper body to commingle the liquified plastics. Alternatively, an ultrasonic bonding device applied to the head can also liquify and cause a flowing together of plastic from the lower side of the head and the top, exterior surface of the upper body 102.

In some instances, it may be desired to drive the fastener into the lower body 104 and at a later time, fasten the upper body 102 thereto. For example, the lower body could be a plate to which may be fastened a number of very small components at a later time during an assembly process. The plastic fastener 100b may be used in such a process with a lower portion 140 that is driven into a bore 142 in the lower plate body 104 until a collar 144 on the plastic fastener 100b hits the top surface of the lower plate body 104. The lower portion is bonded to the lower plate body by a bonding agent or ultrasonic heating to commingle the plastic from the protrusions 146 on the lower portion, and plastic on the exterior wall of the lower body. The underside of the collar may also be bonded to the lower plate body by the bonding agent or ultrasonic mixing of the collar plastic and the top surface of the lower plate body. The protrusions and the annular body of the plastic fastener 100b may be made in the same manner and function as described above for the plastic fastener 100.

With the lower portion 140 firmly secured in the lower plate body 104, a remaining upper portion or half 150 of the plastic fastener 100b projects upwardly from the lower plate body. When it is time to fasten a component or another plate to the lower plate body 104, a hole which is formed in the component and which is sized to have a force fit with the upper portion 150 of the plastic fastener is forced over the upstanding fastener portion 150. The plastic of the upper portion 150 flows and mixes with the plastic of the wall defining the hole in component body. This flowing of the respective plastics and the mixing thereof is due either to a bonding agent such as acetone, cyanoacrylate ester or the like or an ultrasonic liquefying and mixing of plastics so that the protrusions lose their original size and shape. When the plastic hardens, the component will be securely held by the upper portion 150 of plastic fastener; and, because the lower half portion 140 is integral with the upper half portion 150 and securely fastened in the lower plate portion 104, the component body will be secured to the lower plate body 104.

If for some reason a plastic fastener, such as the plastic fastener 100 joining the upper plate body 102 to the lower plate, should fail or be severed, it can be replaced by drilling out the plastic fastener with a drill bit of a larger diameter than the plastic fastener. A new, larger diameter, plastic fastener 100 may then be force fitted into this larger drilled hole and its plastic caused to flow and mix with the plastic of the upper plate body 102 and the plastic of the lower plate body 104 which mixed plastic, when re-solidified, joins the respective upper and lower plates to the respective upper and lower portions of the plastic fastener of the larger diameter.

The force fit is desired to apply compression forces to the plastic to cause plastic flow into the spaces about the protrusions. The cyanoacrylate ester seems to liquify the plastics and cause them to flow only when under compression from the two surfaces to be joined.

From the foregoing, it will be seen that there is a new and improved method of joining plastic articles together with a novel plastic fastener and that a new and improved manner of securing plastic components to a plastic body or plate is provided. The invention provides a quick and inexpensive joinder of plastic articles or bodies usable in automated or manual, large scale assembly operations and provides a good adhering of the component bodies to a plastic body or plate.

What is claimed is:

1. In a plastic article, the combination comprising:
   a first body made of plastic and having an interior surface and an exterior surface;
   a second body made of plastic and having an interior surface and an exterior surface;
   a first bore wall defining a bore in the first body;
   a second bore wall defining a bore in the second body for alignment with the first bore wall when the interior surface of the first body is engaging the interior surface of the second body;
   at least one plastic fastener for insertion into the respective first bore and into second bore to join the first body to the second body;
   integral plastic projections projecting outwardly from the plastic fastener for compression by the first and second bore walls when the plastic fastener is forced into the first and second bores; and
   the plastic of the projections in the fastener being integrally bonded to the plastic of the first body by bringing the protrusions engaging the first bore wall to a flowable condition to intermix and then to solidify to join the first body to the plastic fastener, the plastic of the projections in the fastener being integrally bonded to the plastic of the second body by bringing the protrusions engaging the second bore wall to a flowable condition to intermix and then to solidify and join the second body to the plastic fastener so that the first and second bodies are joined by a common plastic fastener.

2. An article in accordance with claim 1 in which the plastic fastener is a hollow tubular member having an outer cylindrical surface and rows of spaced projections for being brought to the flowable state to flow into spaces between the projections.

3. An article in accordance with claim 2 in which the projections have angled surfaces integrally formed on the outer cylindrical surface and projecting outwardly at an angle from the outer cylindrical surface, the projections having oppositely-angled surfaces to resist rotation of the plastic fastener in either direction of rotation.

4. An article in accordance with claim 2 wherein the tubular member has an outer head at one end to abut the exterior surface of the first plastic body.

5. An article in accordance with claim 2 wherein the tubular member has a radially projecting collar thereon intermediate the ends of the tubular member dividing the tubular member into upper and lower portions, the collar abutting the interior surface of the first plastic body to limit insertion of the lower portion thereby leaving the upper portion for insertion into the second plastic body.

* * * * *